(12) United States Patent
Sakurazawa

(10) Patent No.: US 9,707,945 B2
(45) Date of Patent: Jul. 18, 2017

(54) VEHICLE BRAKE CONTROL APPARATUS

(71) Applicant: NISSIN KOGYO CO., LTD., Ueda, Nagano (JP)

(72) Inventor: Motoaki Sakurazawa, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 190 days.

(21) Appl. No.: 14/574,875

(22) Filed: Dec. 18, 2014

(65) Prior Publication Data

US 2015/0183411 A1 Jul. 2, 2015

(30) Foreign Application Priority Data

Dec. 26, 2013 (JP) ................................ 2013-269123

(51) Int. Cl.
*B60T 13/00* (2006.01)
*B60K 6/00* (2006.01)
(Continued)

(52) U.S. Cl.
CPC ................ *B60T 8/18* (2013.01); *B60T 7/042* (2013.01); *B60T 8/3265* (2013.01); *B60T 8/4081* (2013.01); *B60T 13/686* (2013.01)

(58) Field of Classification Search
None
See application file for complete search history.

(56) References Cited

U.S. PATENT DOCUMENTS 4,398,252 A * 8/1983 Frait ..................... B60T 13/741
   188/3 R
5,378,053 A * 1/1995 Patient .................. B60K 28/16
   188/156

(Continued)

FOREIGN PATENT DOCUMENTS

EP      2460701 A2      6/2012
EP      2671769 A1 *   12/2013
(Continued)

OTHER PUBLICATIONS

Japanese Office Action dated Oct. 13, 2015 in related Japanese Application No. 2013-269123, 7 pages.
(Continued)

*Primary Examiner* — Adam Tissot
(74) *Attorney, Agent, or Firm* — Andrew M. Calderon; Roberts Mlotkowski Safran Cole & Calderon, P.C.

(57) ABSTRACT

A brake system includes a master cylinder, a first solenoid valve, a stroke simulator, a slave cylinder apparatus, and a control apparatus. The master cylinder generates a brake hydraulic pressure in response to an operation on a brake operator. The first solenoid valve is provided between the master cylinder and a wheel brake. The stroke simulator is connected to the master cylinder through a second solenoid valve. The slave cylinder apparatus includes an electric actuator and a cylinder mechanism. The cylinder mechanism generates a brake hydraulic pressure. The control apparatus closes the first solenoid valve and opens the second solenoid valve when the brake hydraulic pressure is increased by the electric actuator. The control apparatus controls the electric actuator so that the larger a carried load on a vehicle is, the larger the brake hydraulic pressure is.

15 Claims, 8 Drawing Sheets

(51) Int. Cl.
*B60L 7/00* (2006.01)
*B60T 8/26* (2006.01)
*B60T 8/18* (2006.01)
*B60T 13/68* (2006.01)
*B60T 7/04* (2006.01)
*B60T 8/32* (2006.01)
*B60T 8/40* (2006.01)

(56) References Cited

U.S. PATENT DOCUMENTS

| | | | | |
|---|---|---|---|---|
| 5,839,800 A | * | 11/1998 | Koga | B60K 6/46 188/156 |
| 5,967,621 A | * | 10/1999 | Ito | B60T 8/00 303/15 |
| 6,367,889 B1 | | 4/2002 | Tsubouchi et al. | |
| 2003/0173826 A1 | * | 9/2003 | Tazoe | B60L 7/26 303/152 |
| 2012/0139330 A1 | | 6/2012 | Morishita | |
| 2013/0270895 A1 | | 10/2013 | Nishioka et al. | |
| 2014/0008965 A1 | * | 1/2014 | Ito | B60T 8/4081 303/3 |

FOREIGN PATENT DOCUMENTS

| | | |
|---|---|---|
| EP | 2671769 A1 | 12/2013 |
| JP | A-H10-250558 | 9/1998 |
| JP | 2001088668 | 4/2001 |
| JP | A-2002-255021 | 9/2002 |

OTHER PUBLICATIONS

European Search Report for the related EP application No. 14199234.7-1756, dated Apr. 23, 2015, 6 pages.

* cited by examiner

VEHICLE BRAKE CONTROL APPARATUS

CROSS REFERENCE TO RELATED APPLICATION

This application is based on and claims priority under 35 U.S.C. §119 to Japanese Patent Application No. 2013-269123 (filed on Dec. 26, 2013), the entire contents of which are incorporated herein by reference.

TECHNICAL FIELD

Exemplary embodiments of the invention relate to a brake system.

RELATED ART

There has been known a brake system including an input rod, a negative pressure type brake booster, a master cylinder, a solenoid, and a load detection sensor. The input rod is connected to a brake pedal. A negative pressure type brake booster is connected to the input rod. The master cylinder includes a piston connected to an output rod of the brake booster. The solenoid is provided in the brake booster and assists a force output from the output rod. The load detection sensor detects a load such as a luggage loaded on a vehicle (see JP 2001-088668 A (corresponding to U.S. Pat. No. 6,367,889 B1)). According to this technique, the assistance force of the solenoid is increased with increase of the load detected by the load detection sensor. Thereby, it is possible to suppress feeling of braking from varying due to a difference in loaded quantity.

SUMMARY

In JP 2001-088668 A, however, in order to assist the output of the output rod is by the solenoid, that is, to increase a stroke amount of the output rod, the stroke amount of the input rod connected to the output rod increases, which causes a driver to get a strange feeling from a braking operation.

Exemplary embodiments of the invention provide a brake system that can execute brake control in accordance with a carried load without a driver getting a strange feeling from the braking operation.

(1) According to one exemplary embodiment, a brake system includes a master cylinder, a first solenoid valve, a stroke simulator, a slave cylinder apparatus, and a control apparatus. The master cylinder is configured to generate a brake hydraulic pressure in response to an operation on a brake operator. The first solenoid valve is provided between the master cylinder and a wheel brake. The stroke simulator is provided between the master cylinder and the first solenoid valve and connected to the master cylinder through a second solenoid valve. The slave cylinder apparatus includes an electric actuator and a cylinder mechanism. The cylinder mechanism is configured to generate a brake hydraulic pressure, which is applied to the wheel brake, by a driving force from the electric actuator. The control apparatus is configured to control the first solenoid valve, the second solenoid valve and the electric actuator. The control apparatus is configured to close the first solenoid valve and open the second solenoid valve when the brake hydraulic pressure is increased by the electric actuator. The control apparatus is configured to control the electric actuator so that the larger a carried load on a vehicle is, the larger the brake hydraulic pressure is.

With this configuration, the control apparatus increases the brake hydraulic pressure in accordance with increase of the carried load. Therefore, feeling of braking during deceleration of the vehicle can be restrained from changing due to a difference in carried load. Also, when the brake hydraulic pressure is increased by the electric actuator, the first solenoid valve is closed and the second solenoid valve is opened. Thus, pulsation of brake liquid transmitted from the slave cylinder apparatus to the master cylinder can be suppressed, by means of the first solenoid valve, from being transmitted toward the master cylinder (driver). In addition, the hydraulic pressure generated from the master cylinder is absorbed by the stroke simulator through the second solenoid valve. Accordingly, a driver can operate the brake operator without any strange feeling.

(2) The brake system of (1) may further include an operation amount detector. The operation amount detector is configured to detect the operation amount of the brake operator. The control apparatus includes a storage and a deceleration estimator. The storage is configured to store a reference table indicating a relationship between the operation amount and a reference deceleration. The deceleration estimator is configured to estimate a deceleration of the vehicle. The control apparatus is configured to calculate the reference deceleration based on the operation amount detected by the operation amount detector and the reference table, and control the electric actuator to increase the brake hydraulic pressure so that a difference between the deceleration estimated by the deceleration estimator and the reference deceleration is reduced when the estimated deceleration is smaller than the reference deceleration.

With this configuration, the reference table indicating the relationship between the operation amount and the reference deceleration is stored in the storage in advance. Therefore, the brake control can be executed in accordance with the carried load without a load detection sensor. Thus, cost increase can be suppressed. In addition, since the brake control is executed based on the deceleration, the brake control can be performed appropriately in accordance with an actual deceleration of the vehicle even if the deceleration of the vehicle differs due to a position of a luggage, a cargo or the like loaded on the vehicle in spite of the same load, as compared with a related-art technique in which brake control is executed, for example, based on a signal from a load detection sensor.

(3) In the brake system of (2), the control apparatus may be configured to control the electric actuator so that the deceleration estimated by the deceleration estimator follows the reference deceleration.

With this configuration, the deceleration estimated by the deceleration estimator follows the reference deceleration, so that the feeling of braking during deceleration of the vehicle can be suppressed from changing due to a difference in carried load.

(4) In the brake system according to any one of (2) and (3), the deceleration estimator may estimate the deceleration based on a wheel speed detected by a wheel speed sensor.

With this configuration, the deceleration is estimated based on the wheel speed. It is not necessary to provide a special sensor that detects the deceleration, but it is possible to suppress cost increase.

(5) According to another exemplary embodiment, a brake system includes a master cylinder, a first solenoid valve, a stroke simulator, a slave cylinder apparatus, an operation amount detector, and a control apparatus. The master cylinder is configured to generate a brake hydraulic pressure in response to an operation on a brake operator. The first solenoid valve is provided between the master cylinder and a wheel brake. The stroke simulator is provided between the master cylinder and the first solenoid valve and connected to the master cylinder through a second solenoid valve. The slave cylinder apparatus includes an electric actuator and a cylinder mechanism. The cylinder mechanism is configured to generate a brake hydraulic pressure, which is applied to the wheel brake, by a driving force from the electric actuator. The operation amount detector is configured to detect the operation amount of the brake operator. The control apparatus is configured to control the first solenoid valve, the second solenoid valve and the electric actuator. The control apparatus includes a storage and a deceleration estimator. The storage is configured to store a reference table indicating a relationship between the operation amount and a reference deceleration. The deceleration estimator is configured to estimate a deceleration of the vehicle. The control apparatus is configured to close the first solenoid valve and open the second solenoid valve when the brake hydraulic pressure is increased by the electric actuator. The control apparatus is configured to calculate the reference deceleration based on the operation amount detected by the operation amount detector and the reference table, and control the electric actuator to increase the brake hydraulic pressure so that a difference between the deceleration estimated by the deceleration estimator and the reference deceleration is reduced when the estimated deceleration is smaller than the reference deceleration.

With this configuration, the deceleration of the vehicle decreases in accordance with increase in load of the vehicle. If the brake hydraulic pressure is increased in a case where the deceleration is smaller than the reference deceleration, the brake hydraulic pressure can be increased in accordance with increase in carried load. Therefore, feeling of braking during deceleration of the vehicle can be restrained from changing due to a difference in carried load. Also, when the brake hydraulic pressure is increased by the electric actuator, the first solenoid valve is closed and the second solenoid valve is opened. Thus, pulsation of brake liquid transmitted from the slave cylinder apparatus to the master cylinder can be suppressed, by means of the first solenoid valve, from being transmitted toward the master cylinder (driver). In addition, the hydraulic pressure generated from the master cylinder is absorbed by the stroke simulator through the second solenoid valve. Accordingly, a driver can operate the brake operator without any strange feeling.

According to the above described configurations, it is possible to execute brake control in accordance with a difference in carried load without giving a driver strange feeling during braking operation.

DETAILED DESCRIPTION

Exemplary embodiments of the invention will be described in detail with reference to the accompanying drawings.

Figure 1:
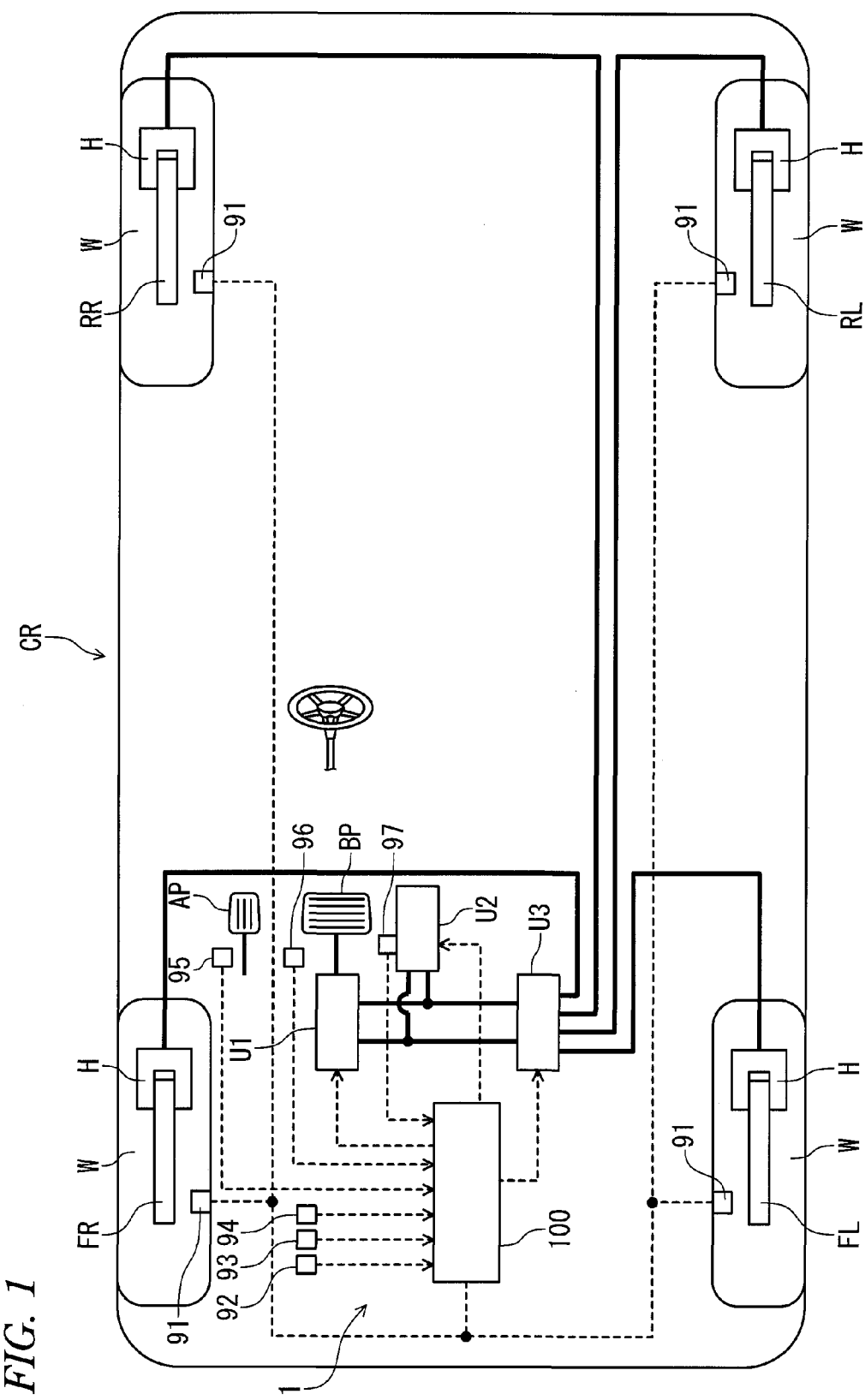
FIG. 1 is a configuration diagram showing a vehicle including a control apparatus that is an example of a vehicle brake hydraulic pressure control apparatus according to one exemplary embodiment of the invention.

As shown in FIG. 1, a brake system 1 according to one exemplary embodiment includes a brake-by-wire electric brake system for normal use and a hydraulic brake system as a fail-safe system. The brake-by-wire electric brake system transmits an electric signal to a brake so that the brake operates. The hydraulic type brake system transmits, to the brake as it is, a hydraulic pressure generated by a depression force applied to a brake pedal BR (which is an example of a brake operator) so as to operate the brake.

To this end, the brake system 1 includes an input apparatus U1, a slave cylinder apparatus U2, and a hydraulic pressure control unit U3. When a driver operates the brake pedal BP, the operation is input to the input apparatus U1. The slave cylinder apparatus U2 generates a brake hydraulic pressure in accordance with (i) an operation amount (hereinafter also referred to as "brake operation amount") of the brake pedal BP and (ii) required control. The hydraulic pressure control unit U3 is configured to execute brake hydraulic pressure control for assisting stabilization of vehicle behavior. Each of the input apparatus U1, the slave cylinder apparatus U2 and the hydraulic pressure control unit U3 includes two systems. A first system of the two systems controls a right front wheel brake FR and a left rear wheel brake RL. A second system of the two systems controls a left front wheel brake FL and a right rear wheel brake RR. The systems are connected independently of each other by hydraulic pressure paths including piping such as hoses and tubes. Also, the input apparatus U1 and the slave cylinder apparatus U2 are electrically connected to each other through a harness (not shown).

In order to control vehicle behavior by the electric brake system and the hydraulic pressure control unit U3, the brake system 1 includes, in appropriate positions in a vehicle CR, a wheel speed sensor 91, a steering angle sensor 92, a lateral acceleration sensor 93, a longitudinal acceleration sensor 94, an accelerator pedal stroke sensor 95, a brake pedal stroke sensor 96 (which is as an example of an operation amount detector), and a motor rotation angle sensor 97. The accelerator pedal stroke sensor 95 detects a stroke of an accelerator pedal AP. The brake pedal stroke sensor 96 detects a stroke (brake operation amount) of the brake pedal BP. Output values of the sensors are output to a control apparatus 100. The motor rotation angle sensor 97 is a sensor for detecting a rotation angle of an electric motor 42 (see FIG. 2) which is an example of an electric actuator that drives the slave cylinder apparatus U2.

The control apparatus 100 includes, for example, a CPU (Central Processing Unit), a RAM (Random Access Memory), a ROM (Read Only Memory) and an input/output circuit. The control apparatus 100 executes various arithmetic processes based on the output values of the sensors and programs and data stored in the ROM so as to control the input apparatus U1, the slave cylinder apparatus U2, and the hydraulic pressure control unit U3. With this configuration, the control apparatus 100 can control brake hydraulic pressures applied to wheel cylinders H of the wheel brakes FR, RL, FL and RR so as to apply suitable braking forces to the wheels W.

Figure 2:
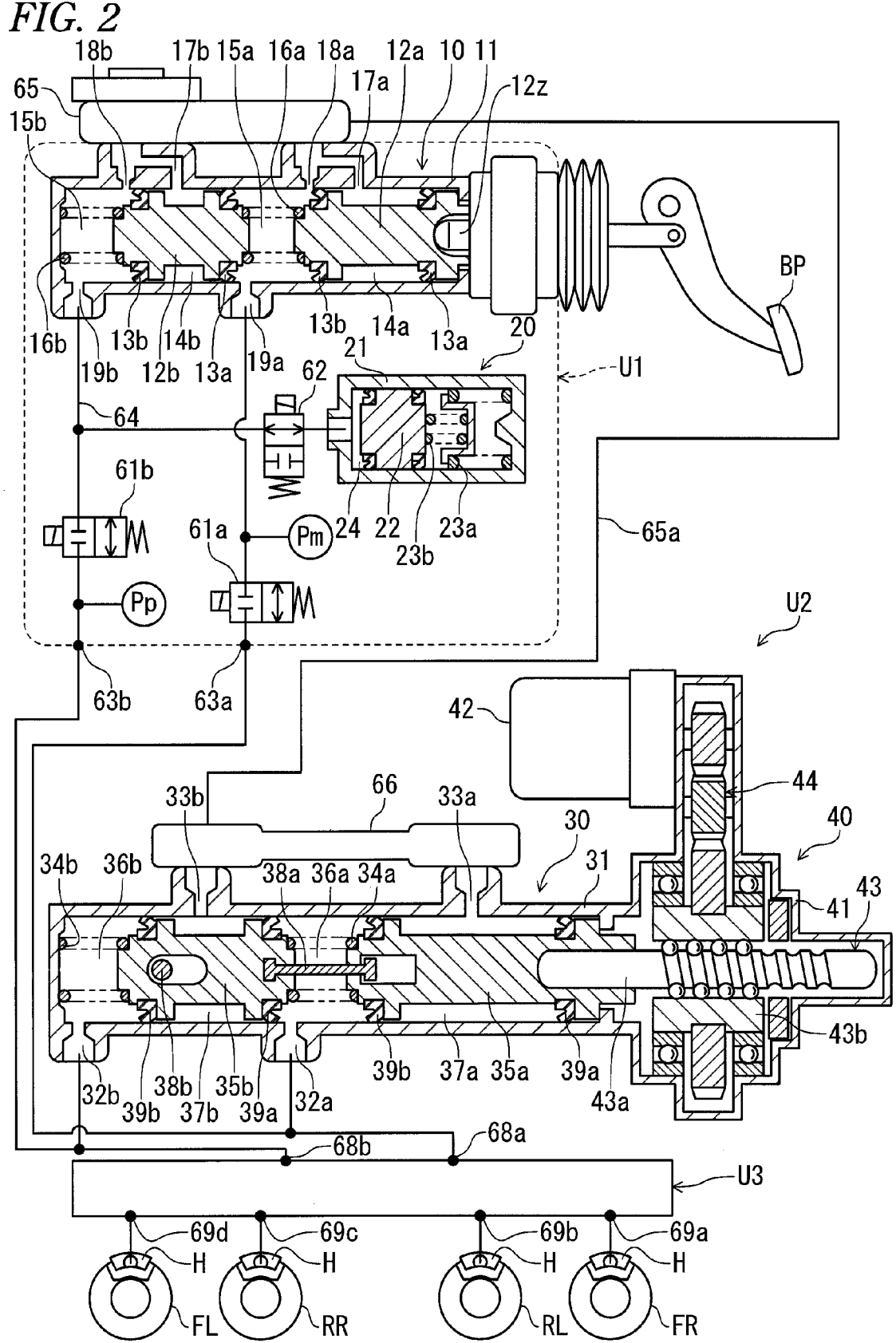
FIG. 2 is a configuration diagram showing a brake hydraulic pressure circuit of an input device and a slave cylinder apparatus.

As shown in FIG. 2, a connection port 63a of the first system of the input apparatus U1 is connected, by piping, to an output port 32a of the slave cylinder U2 and an input port 68a of the hydraulic pressure control unit U3. Similarly, a connection port 63b of the second system of the input apparatus U1 is connected, by piping, to an output port 32b of the slave cylinder U2 and an input port 68b of the hydraulic pressure control unit U3.

The hydraulic pressure control unit U3 includes four output ports 69a to 69d. The wheel cylinders H of the wheel brakes FR, RL, RR and FL are connected to the output ports 69a to 69d, respectively.

[Input Apparatus U1]

The input apparatus U1 includes a tandem type master cylinder 10 and a first reservoir 65. The master cylinder 10 can generate a hydraulic pressure in accordance with driver's operation of the brake pedal BP. The first reservoir 65 is provided along the master cylinder 10. A first piston 12a and a second piston 12b are slidably disposed in a cylinder tube 11 of the master cylinder 10. The first piston 12a and the second piston 12b are separated from each other by a predetermined distance in an axial direction of the cylinder tube 11. The first piston 12a is disposed near the brake pedal BP. The first piston 12a is connected to the brake pedal BP through a push rod 12z. Also, the second piston 12b is disposed so as to be farther from the brake pedal BP than the first piston 12a.

A pair of piston packings 13a and 13b is attached to an outer peripheral surface of each of the first piston 12a and the second piston 12b. The paired piston packings 13a and 13b are separated from each other in an axial direction. A diameter of the first piston 12a is made smaller between the piston packings 13a and 13b to define a back chamber 14a between the piston packings 13a and 13b. Also, a diameter of the second piston 12b is made small between the piston packings 13a and 13b to define a back chamber 14b between the piston packings 13a and 13b. The back chambers 14a and 14b are connected to the first reservoir 65 through supply ports 17a and 17b, respectively.

A first pressure chamber 15a is defined between the first piston 12a and the second piston 12b. The first pressure chamber 15a is connected to the first reservoir 65 through a relief port 18a. Similarly, a second pressure chamber 15b is defined between the second piston 12b and a side end portion of the cylinder tube 11. The second pressure chamber 15b is connected to the first reservoir 65 through a relief port 18b. When the driver depresses the brake pedal BP, the first pressure chamber 15a and the second pressure chamber 15b generate brake hydraulic pressures corresponding to the depressing force.

A spring 16a is provided between the first piston 12a and the second piston 12b. A spring 16b is provided between the second piston 12b and the side end portion of the cylinder tube 11. Thereby, when the driver stops operating the brake pedal BP, volumes of the first pressure chamber 15a and the second pressure chamber 15b can be restored to their suitable volumes.

Also, output ports 19a and 19b communicating with the pressure chambers 15a and 15b are defined in the cylinder tube 11 so as to correspond to the pressure chambers 15a and 15b, respectively. The output ports 19a and 19b are connected to the connection ports 63a and 63b of the input apparatus U1 through piping, respectively.

A normally open solenoid valve 61a (which is an example of a first solenoid valve) is disposed on a piping that connects between the output port 19a of the master cylinder 10 and the connection port 63a of the input apparatus U1. A normally open solenoid valve 61b (which is another example of the first solenoid valve) is disposed on a piping that connects between the output port 19b of the master cylinder 10 and the connection port 63b of the input apparatus U1.

A stroke simulator 20 is connected to a piping (a branch hydraulic pressure path 64) that connects between the output port 19b of the master cylinder 10 and the normally open solenoid valve 61b, through a normally close solenoid valve 62 (which is an example of a second solenoid valve).

In FIG. 2, the normally open solenoid valves 61a and 61b are in a state where the normally open solenoid valves 61a and 61b are energized and operate normally (that is, in a close state), and the normally close solenoid valve 62 is in a state where the normally close solenoid valve 62 energized and operates normally (that is, in an open state).

The stroke simulator 20 is a device configured to generate a stroke of a brake and a reaction force during brake-by-wire control so as to make the driver feel as if a depressing force were to generate a braking force. A piston 22 is disposed in a cylinder 21. A hydraulic pressure chamber 24 is defined on one side of the piston 22. The hydraulic pressure chamber 24 communicates with the branch hydraulic pressure path 64 through the normally close solenoid valve 62. The hydraulic pressure chamber 24 can absorb brake liquid from the second pressure chamber 15b of the master cylinder 10.

A first return spring 23a having a high spring constant and a second return spring 23b having a low spring constant are provided in series between the piston 22 and a side end portion of the cylinder 21. Thereby, a gradient (which is a positive value) of the pedal reaction force is low at an initial stage of depressing of the brake pedal BP, and a gradient (which is a positive value) of the pedal reaction force is high at a later stage of the depressing of the brake pedal BP. Thus, pedal feeling of the brake pedal BP is equivalent to that in an existing master cylinder.

A first hydraulic pressure sensor Pm is disposed on a hydraulic pressure path that connects between the output port 19a of the master cylinder 10 and the normally open solenoid valve 61a. A second hydraulic pressure sensor Pp is provided on a hydraulic pressure path that connects between the normal open type solenoid valve 61b and the connection port 63b. The first hydraulic pressure sensor Pm measures a hydraulic pressure on the master cylinder 10 side of the normally open solenoid valve 61a, which is closed during its normal operation. The second hydraulic pressure sensor Pp measures a hydraulic pressure on the connection port 63b side (hydraulic pressure control unit U3 side) of the normally open solenoid valve 61b, which is closed during its normal operation. Output values of the first and second hydraulic pressure sensors Pm and Pp are supplied to the control apparatus 100.

[Slave Cylinder Apparatus U2]

The slave cylinder apparatus U2 includes an actuator mechanism 40 and a cylinder mechanism 30. The actuator mechanism 40 includes an electric motor 42. The cylinder mechanism 30 is operated by the actuator mechanism 40.

The actuator mechanism 40 includes an actuator housing 41. The actuator housing 41 houses a ball screw mechanism 43 and a reduction gear train 44. The ball screw mechanism 43 includes a screw shaft 43a and a nut 43b. The reduction gear train 44 transmits a rotation operation of the electric motor 42 to the nut 43b. The screw shaft 43a is connected to a first slave piston 35a which will be described later.

The cylinder mechanism 30 includes a cylinder body 31 and a second reservoir 66 which is provided along the cylinder body 31. The second reservoir 66 is connected to the first reservoir 65 through a piping 65a. A first slave piston 35a and a second slave piston 35b are slidably disposed in the cylinder body 31. The first slave piston 35a and the second slave piston 35b are separated from each other at a predetermined interval in an axial direction of the cylinder body 31. The first slave piston 35a is disposed near the ball screw mechanism 43. The first slave piston 35a abuts against one end portion of the screw shaft 43a and can be displaced in a longitudinal direction of the cylinder body 31 together with the screw shaft 43a. Also, the second slave piston 35b is farther from the ball screw mechanism 43 than the first slave piston 35a.

A pair of slave piston packings 39a and 39b are attached to an outer peripheral surface of each of the first slave piston 35a and the second slave piston 35b. The paired slave piston packings 39a and 39b are separated from each other in an axial direction. A diameter of the first slave piston 35a is made smaller between the slave piston packings 39a and 39b to define a first back chamber 37a between the slave piston packings 39a and 39b. Also, a diameter of the first slave piston 35a and the second slave piston 35b is made smaller between the slave piston packings 39a and 39b to define a second back chamber 37b between the slave piston packings 39a and 39b. The first back chamber 37a and the second back chamber 37b are connected to the second reservoir 66 through reservoir ports 33a and 33b, respectively.

A first hydraulic pressure chamber 36a is defined between the first slave piston 35a and the second slave piston 35b. A second hydraulic pressure chamber 36b is defined between the second slave piston 35b and a side end portion of the cylinder body 31. Also, output ports 32a and 32b communicating with the first hydraulic pressure chamber 36a and the second hydraulic pressure chamber 36b are defined in the cylinder body 31 so as to correspond to the first hydraulic pressure chamber 36a and the second hydraulic pressure chamber 36b, respectively. The output ports 32a and 32b are connected to the connection ports 63a and 63b of the input apparatus U1 and the input ports 68a and 68b of the hydraulic pressure control unit U3, respectively. The first hydraulic pressure chamber 36a and the second hydraulic pressure chamber 36b are configured so that when the screw shaft 43a moves toward the first slave piston 35a due to the operation of the electric motor 42, the first hydraulic pressure chamber 36a and the second hydraulic pressure chamber 36b generate brake hydraulic pressures and supply the generated hydraulic pressures to the hydraulic pressure control unit U3 through the output ports 32a and 32b.

A spring 34a is provided between the first slave piston 35a and the second slave piston 35b. A spring 34b is provided between the second slave piston 35b and the side end portion of the cylinder body 31. Thereby, when the screw shaft 43a moves to an opposite side to the first slave piston 35a due to the operation of the electric motor 42, volumes of the first hydraulic pressure chamber 36a and the second hydraulic pressure chamber 36b can be restored to their suitable volumes.

A regulation link 38a is provided between the first slave piston 35a and the second slave piston 35b. The regulation link 38a is configured to regulate maximum strokes (maximum displacement distances) and minimum strokes (minimum displacement distances) of the first slave piston 35a and the second slave piston 35b. A stopper pin 38b is provided in the second slave piston 35b. The stopper pin 38b is configured to regulate a sliding range of the second slave piston 35b to thereby inhibit the second slave piston 35b from overreturning toward the first slave piston 35a.

[Hydraulic Pressure Control Unit U3]

Figure 3:
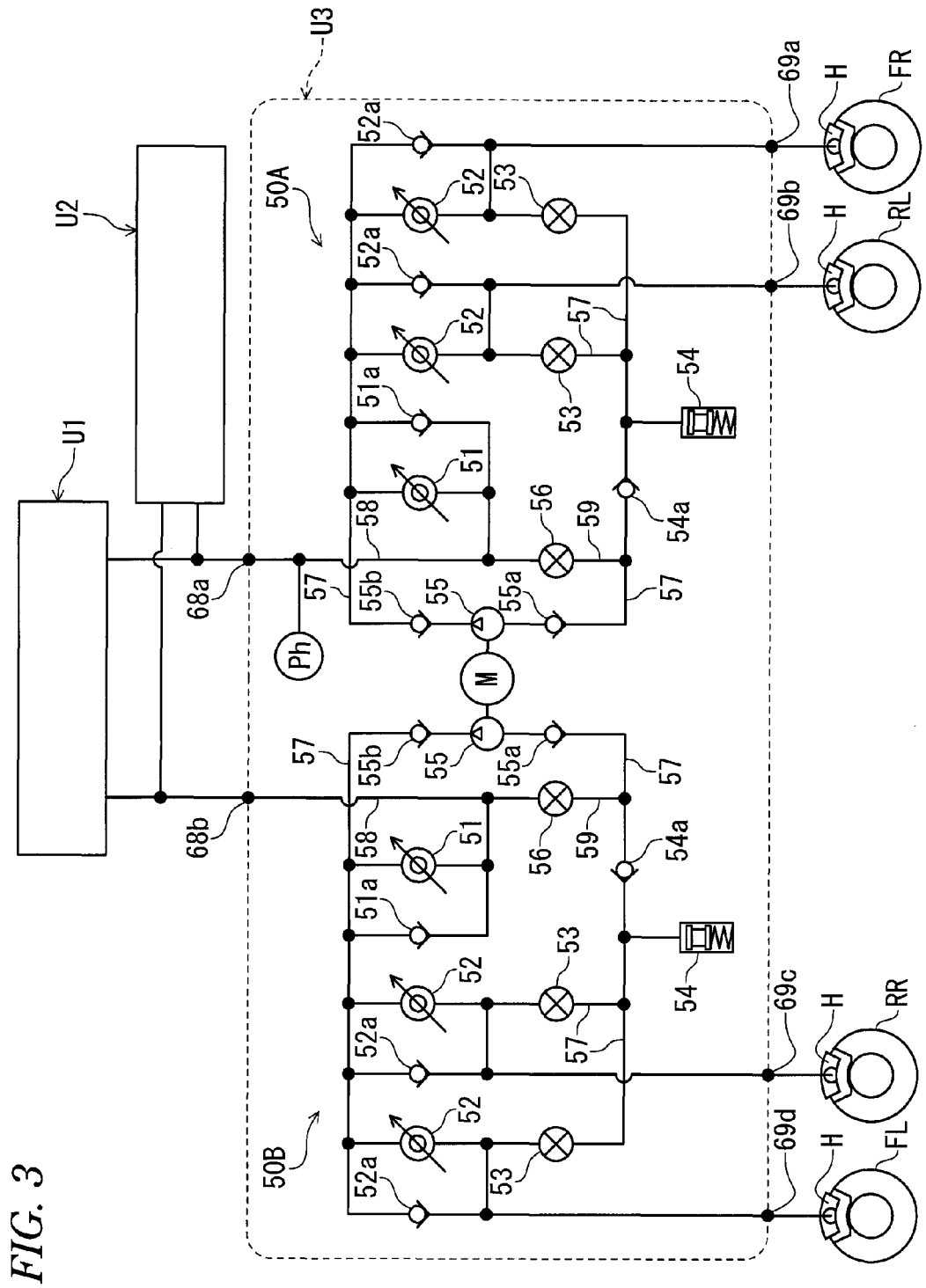
FIG. 3 is a configuration diagram showing a brake hydraulic pressure circuit of a hydraulic pressure control unit.

As shown in FIG. 3, the hydraulic pressure control unit U3 includes a first hydraulic pressure system 50A for controlling the wheel brakes FR and RL and a second hydraulic pressure system 50B for controlling the wheel brakes FL and RR. The first hydraulic pressure system 50A and the second hydraulic pressure system 50B have similar configurations to each other. Thus, description will be given only on the first hydraulic pressure system 50A here, and description on the second hydraulic pressure system 50B will be omitted.

The first hydraulic pressure system 50A includes a pressure regulating valve 51 on a hydraulic pressure path connecting the input port 68a with the output ports 69a and 69b. The pressure regulating valve 51 is a normally open proportional solenoid valve that can adjust a difference in hydraulic pressure between an upstream side thereof and a downstream side thereof, in accordance with an electric current supplied thereto. A check valve 51a is provided in parallel to the pressure regulating valve 51. The check valve 51a allows a hydraulic pressure to flow only toward the output ports 69a and 69b.

A hydraulic pressure path on a side of the wheel brakes RL and FR with respect to the pressure regulating valve 51 branches off on its halfway. The branches are connected to the output port 69a and the output port 69b, respectively. Inlet valves 52 are disposed on hydraulic pressure paths corresponding to the output ports 69a and 69b, respectively. The inlet valves 52 are normally open proportional solenoid valves. A check valve 52a is disposed in parallel with each inlet valve 52. Each check valve 52a allows a hydraulic pressure to flow only toward the pressure regulating valve 51.

Feedback hydraulic pressure paths 57 are provided to extend from a hydraulic pressure path between the output port 69a and the inlet valve 52 corresponding to the output port 69a and a hydraulic pressure path between the output port 69b and the inlet valve 52 corresponding to the output port 69b, respectively. The feedback hydraulic pressure paths 57 are connected between the pressure regulating valve 51 and the inlet valves 52 through outlet valves 53. The outlet valves 53 include normally close solenoid valves.

A reservoir 54, a check valve 54a, a check valve 55a, a pump 55 and a check valve 55b are disposed on the feedback hydraulic pressure path 57 in order from the outlet valve 53 side. The reservoir 54 absorbs excessive brake liquid temporarily. Each of the check valves 54a, 55a, 55b is disposed to allow a hydraulic pressure to flow only toward between the pressure regulating valve 51 and the corresponding inlet valves 52. The pump 55 is configured to be driven by a motor M so as to generate a pressure toward between the pressure regulating valve 51 and the inlet valves 52.

An introduction hydraulic pressure path 58 connects the input port 68a with the pressure regulating valve 51. The introduction hydraulic pressure path 58 is connected, by a suction hydraulic pressure path 59, to a portion of the feedback hydraulic pressure path 57 between the check valve 54a and the check valve 55a through a suction valve 56. The suction valve 56 includes a normally closed solenoid valve.

A third hydraulic pressure sensor Ph is provided on the introduction hydraulic pressure path 58 only in the first hydraulic pressure system 50A. An output value of the third hydraulic pressure sensor Ph is supplied to the control apparatus 100.

In the hydraulic pressure control unit U3 having the above described configuration, each solenoid valve is not energized in normal time, a brake hydraulic pressure introduced from the input port 68a is supplied to the output ports 69a and 69b through the pressure regulating valve 51 and the input valves 52 and applied to the wheel cylinders H as they are. In order to reduce an excessive brake hydraulic pressure in a wheel cylinder H and execute antilock brake control, an inlet valve 52 in question is closed and the corresponding outlet valve 53 is opened. Thereby, brake liquid can flow into the reservoir 54 through the corresponding feedback hydraulic passage 57, and the brake liquid in the wheel cylinder H can be reduced. On the other hand, for example, in order to pressurize a wheel cylinder H when the driver does not operate the brake pedal BP, the suction valve 56 is opened and the motor M is then driven. Thereby, brake liquid can be aggressively supplied to the wheel cylinder H by the pressure applied by the pump 55. Furthermore, it may be desired to adjust a degree of the pressure applied to the wheel cylinder H. In this case, an appropriate current is applied to the pressure regulating valve 51 so that the degree of the pressure can be adjusted.

Next, details of the control apparatus 100 will be described.

Figure 4:
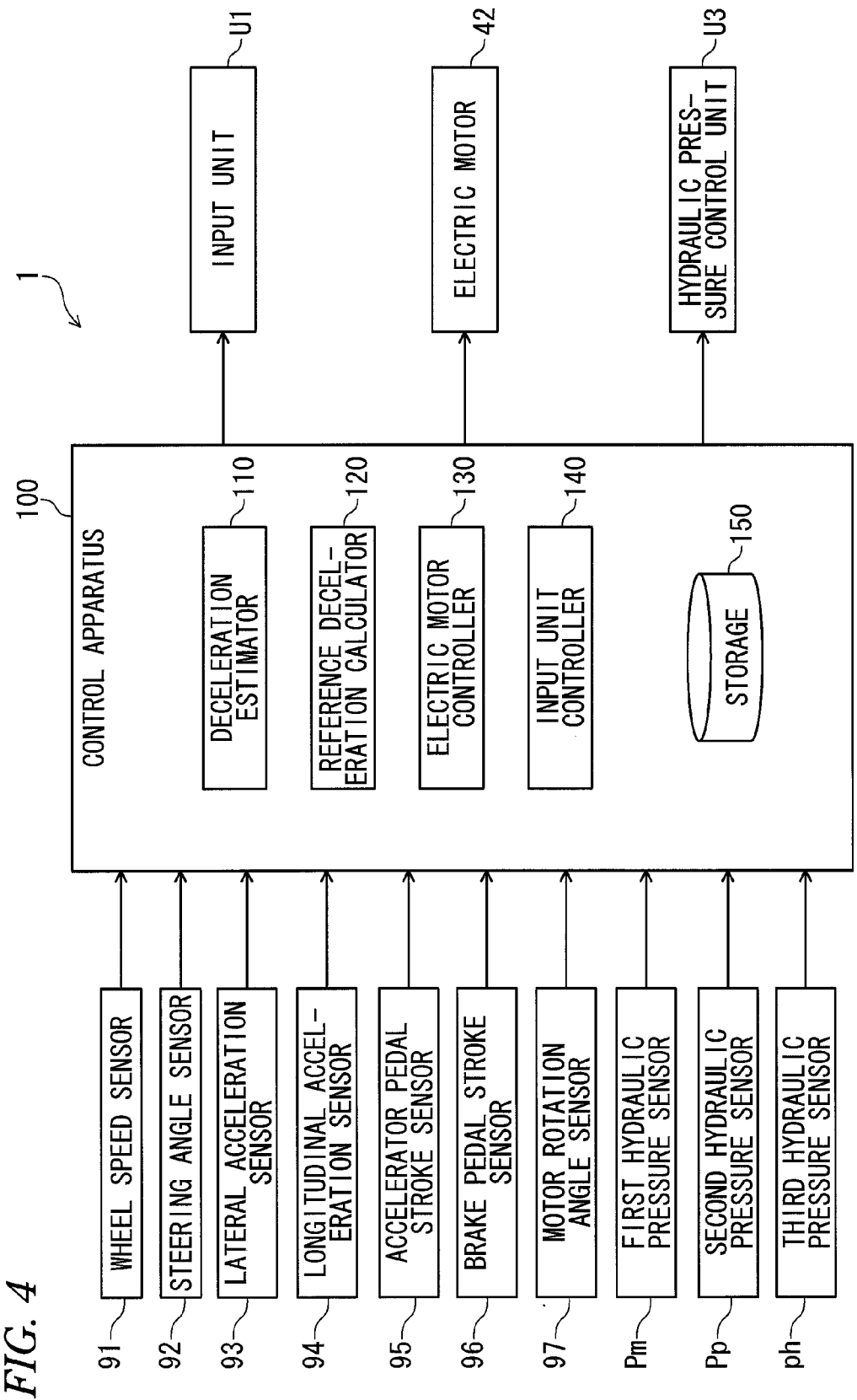
FIG. 4 is a block diagram showing the configuration of the control apparatus.

As shown in FIG. 4, the control apparatus 100 is configured to execute brake-by-wire hydraulic pressure control, ABS (Antilock Brake System) control and the like, based on signals input from the sensors. In this exemplary embodiment, the control apparatus 100 is configured to control the electric motor 42 so that the larger a carried load on the vehicle CR is, the larger a brake hydraulic pressure is.

Specifically, the control apparatus 100 includes a deceleration estimator 110, a reference deceleration calculator 120, an electric motor controller 130, an input unit controller 140, and a storage 150. In this exemplary embodiment, it is assumed that deceleration is handled as a positive value.

The deceleration estimator 110 has a function of estimating a deceleration of the vehicle CR based on the wheel speeds of the wheels W detected by the wheel speed sensors 91. For example, the deceleration estimator 110 calculates the decelerations of the wheels W based on the wheel speeds of the wheels W and estimates the smallest deceleration of the decelerations of the wheels W (the deceleration of the wheel W which is the smallest) as the deceleration of the vehicle CR. When estimating the deceleration, the deceleration estimator 110 outputs the estimated deceleration to the electric motor controller 130.

Figure 5:
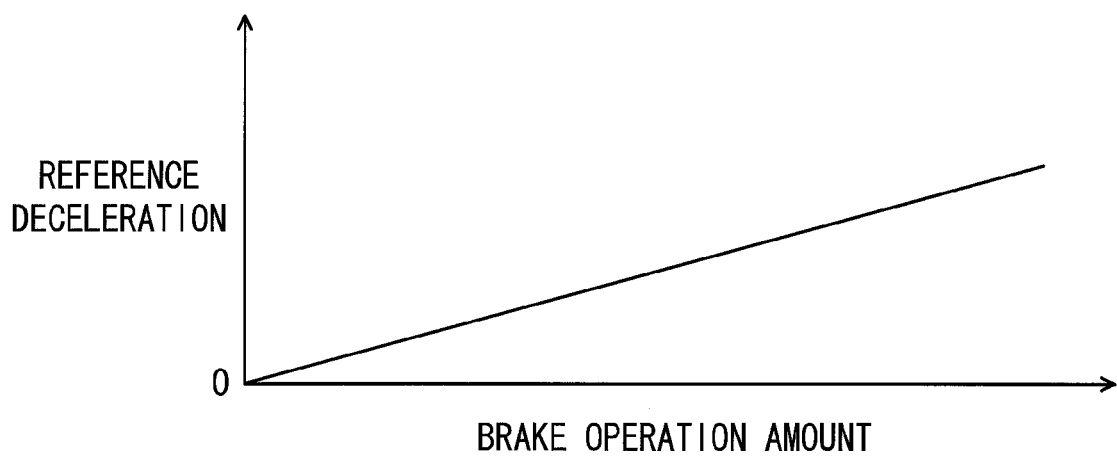
FIG. 5 is a reference table that indicates a relationship between a brake operation amount and a reference deceleration.

The reference deceleration calculator 120 has a function of calculating a reference deceleration based on the brake operation amount detected by a brake pedal stroke sensor 96 and a reference table shown in FIG. 5. The reference table is a table indicating a relationship between the brake operation amount and the reference deceleration. The reference deceleration is a deceleration of the vehicle CR, with respect to a brake operation amount, where a load carried on the vehicle CR is minimum (for example, a state where no one but a driver gets on the vehicle CR and no luggage/cargo is loaded on the vehicle CR) and a friction coefficient of a road surface is a predetermined value (a high value corresponding to a dry road surface).

The reference table may be set appropriately by experiments, simulations, etc. When calculating the reference deceleration, the reference deceleration calculator 120 outputs the calculated reference deceleration to the electric motor controller 130.

The electric motor controller 130 has (i) a function of executing normal control of the electric motor 42 based on the brake operation amount and (ii) a function of controlling the electric motor 42 so that the deceleration output from the deceleration estimator 110 can follow the reference deceleration output from the reference deceleration calculator 120. Specifically, the electric motor controller 130 determines, based on a signal from the brake pedal stroke sensor 96, as to whether or not the brake pedal BP has been depressed by the driver. If the electric motor controller 130 determines that the brake pedal BP has been depressed, the electric motor controller 130 executes the normal control, that is, sets a target value of the brake hydraulic pressure based on the brake operation amount (a graph G1 indicated by one dotted chain lines in FIG. 6) and controls the electric motor 42 so as to increase the brake hydraulic pressure to the target value.

After a predetermined time has elapsed since the brake pedal BP was depressed, the electric motor controller 130 compares the deceleration estimated by the deceleration estimator 110 with the reference deceleration calculated by the reference deceleration calculator 120 and determines as to whether or not the deceleration is smaller than the reference deceleration. If the electric motor controller 130 determines that the deceleration is smaller than the reference deceleration, the electric motor controller 130 resets the target value of the brake hydraulic pressure to a target value which is higher than the current target value of the brake hydraulic pressure, in accordance with a difference between the deceleration and the reference deceleration, and controls the electric motor 42 based on the reset target value.

Figure 6:
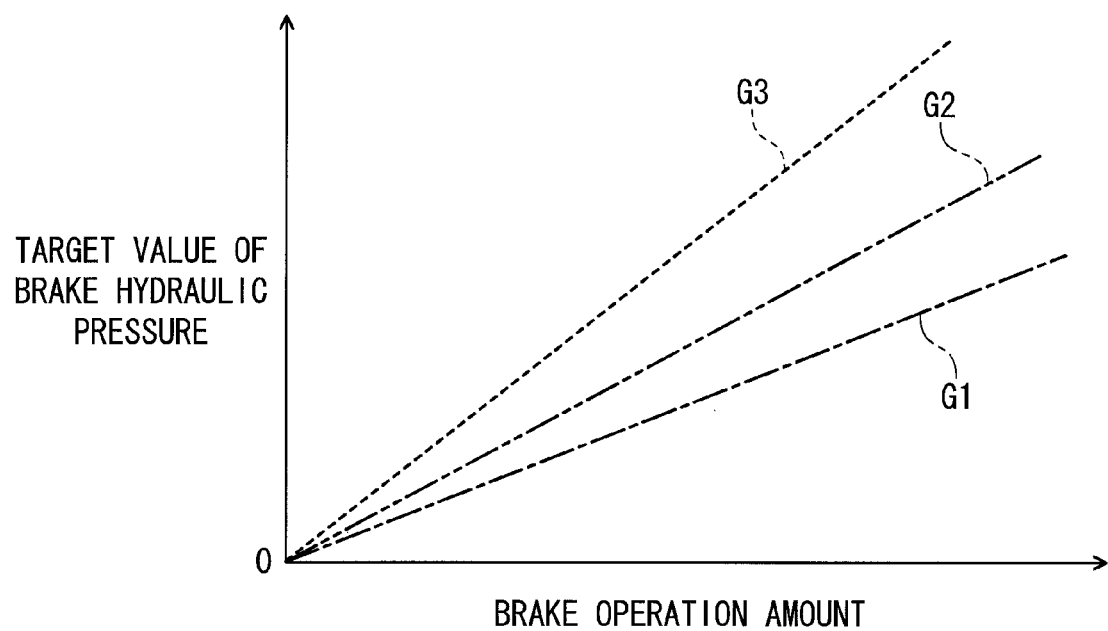
FIG. 6 is a target value setting table that indicates a relationship between the brake operation amount and a target value of a brake hydraulic pressure.

Specifically, the electric motor controller 130 resets the target value of the brake hydraulic pressure in accordance with (i) a target value setting table shown in FIG. 6, (ii) the brake operation amount, and (iii) the difference between the deceleration and the reference deceleration. The target value setting table is a table indicating a relationship between the brake operation amount and the target value of the brake hydraulic pressure. The graph G1 shown by the one dotted chain line indicates a target value when the difference between the deceleration and the reference deceleration is equal to zero. A graph G2 shown by a two dotted chain line indicates a target value when the difference (absolute value) between the deceleration and the reference deceleration is equal to a first value that is larger than zero. A graph G3 shown by a broken line indicates a target value when the difference between the deceleration and the reference deceleration is equal to a second value which is larger than the first value. Graphs to be used when the deceleration is smaller than the reference deceleration are not limited to the two graphs G2 and G3 shown by the two dotted chain line and the broken line. For example, three or more graphs may be used. Also, target values (the graph G2 or G3 shown by the two dotted chain line or the broken line) of the brake hydraulic pressure corresponding to the difference between the deceleration and the reference deceleration may be set appropriately by experiments, simulations, etc. so that the deceleration can follow the reference deceleration when the electric motor 42 is controlled with the target value.

Accordingly, the electric motor controller 130 sets the target value of the brake hydraulic pressure to be a higher value as the deceleration becomes smaller with respect to the reference deceleration. Thereby, the electric motor controller 130 controls the electric motor 42 so that the brake hydraulic pressure becomes higher as the deceleration becomes smaller with respect to the reference deceleration. The deceleration becomes smaller with increase of the carried load on the vehicle CR. Therefore, the electric motor controller 130 substantially controls the electric motor 42 so that the larger the carried load on the vehicle CR is, the larger the brake hydraulic pressure is.

The input unit controller 140 has a function of closing the normally open solenoid valves 61a and 61b and opening the normally close solenoid valve 62, by applying a current to the normally open solenoid valves 61a and 61b and the normally close solenoid valve 62 in the input apparatus U1 when the brake hydraulic pressure is to be increased by the electric motor 42.

The storage 150 stores the reference table, the target value setting table and the like.

Next, description will be given on how the control apparatus 100 operates, in detail.

Figure 7:
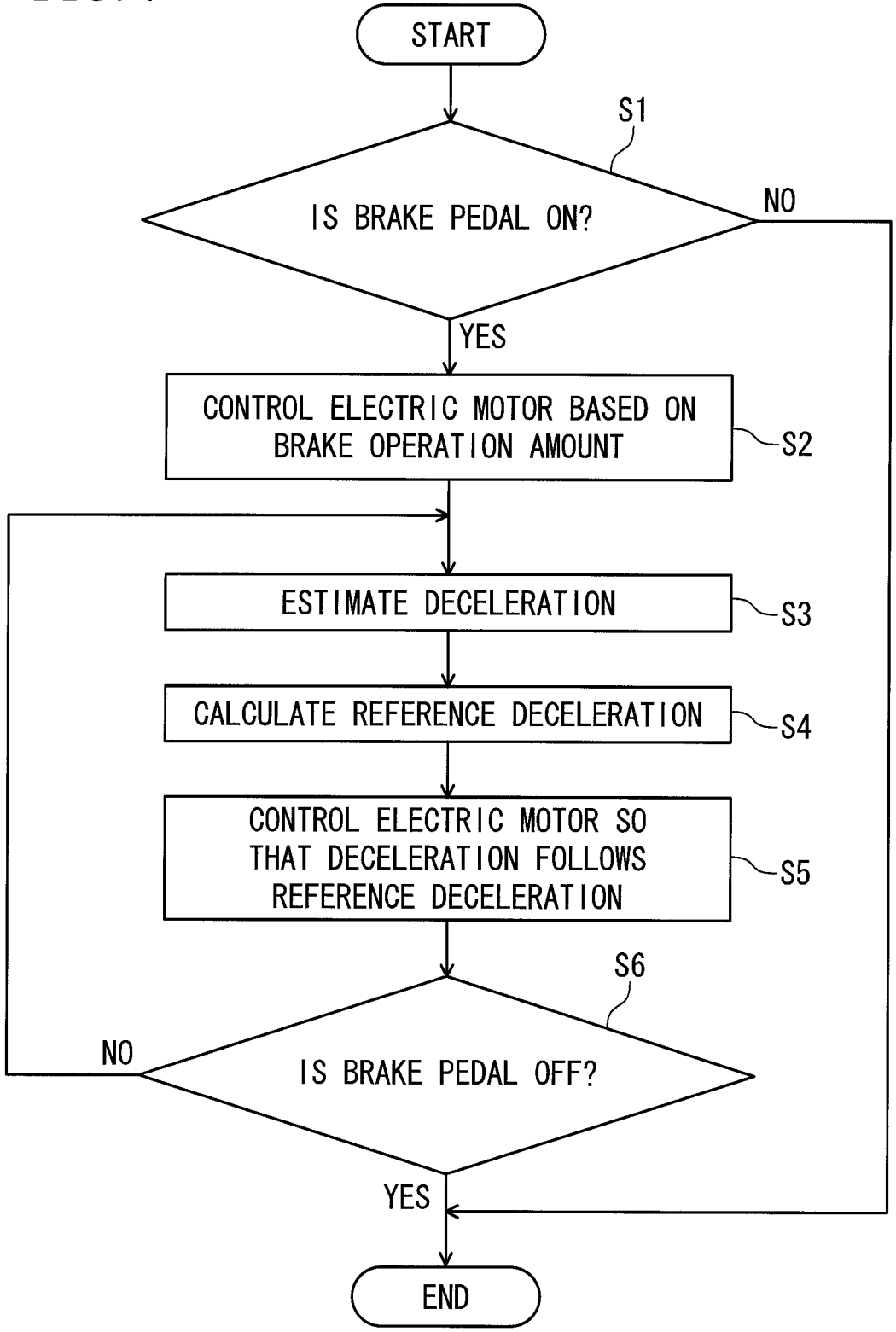
FIG. 7 is a flow chart showing as to how the control apparatus operates.

As shown in FIG. 7, the control apparatus 100 first determines, based on the signal from the brake pedal stroke sensor 96, as to whether or not the brake pedal BP has been depressed, that is, whether or not the brake pedal BP has been turned ON (S1). If determining in step S1 that the brake pedal BP has been turned ON (Yes), the control apparatus 100 sets a target value of the brake hydraulic pressure based on the brake operation amount and in accordance with the graph G1 shown by the one dotted chain line in FIG. 6, and controls the electric motor based on the target value (S2)

After step S2, the control apparatus 100 estimates the deceleration of the vehicle CR based on the signals from the wheel speed sensors 91 (S3). After Step s3, the control apparatus 100 calculates a reference deceleration based on the signal from the brake pedal stroke sensor 96 and the reference table (S4).

After step S4, the control apparatus 100 controls the electric motor 42 so that the deceleration follows the reference deceleration (S5). Specifically, the control apparatus 100 continues to control the electric motor 42 based on the current target value of the brake hydraulic pressure (the graph G1 shown by the one dotted chain line in FIG. 6) until the predetermined time has elapsed since the brake pedal BP was turned ON.

If the predetermined time has elapsed since the brake pedal BP was turned ON, the control apparatus 100 determines as to whether the deceleration is smaller than the reference deceleration. If the deceleration is equal to or larger than smaller than the reference deceleration, the control apparatus 100 continues to control the electric motor 42 based on the current target value of the brake hydraulic pressure (the graph G1 shown by the one dotted chain line in FIG. 6). If the deceleration is smaller than the reference deceleration, the control apparatus 100 selects a graph (for example, the graph G3 shown by the broken line) corresponding to a difference between the deceleration and the reference deceleration based on the difference between the deceleration and the reference deceleration and the target setting table shown in FIG. 6, resets the target value of the brake hydraulic pressure to a higher target value based on the selected graph and the brake operation amount, and controls the electric motor 42 based on the reset target value.

It is noted that after the control apparatus 100 resets the target value of the brake hydraulic pressure in step S5, the control apparatus 100 does not reset the target value so long as the brake pedal BP is ON.

After step S5, the control apparatus 100 determines as to whether or not the brake pedal BP has been turned OFF, based on the signal from the brake pedal stroke sensor 96 (S6). If determining in step S6 that the brake pedal BP is not OFF (No), the control apparatus 100 returns to the process of step S3.

If determining in step S6 that the brake pedal BP has been turned OFF (Yes) or if determining No in step S1, the control apparatus 100 terminates this control.

Next, description will be given on changes of various parameters where a vehicle CR with a large carried load is braked. First, description will be given on a case where the electric motor 42 is controlled with no consideration for deceleration as in a related art.

Figure 8A:
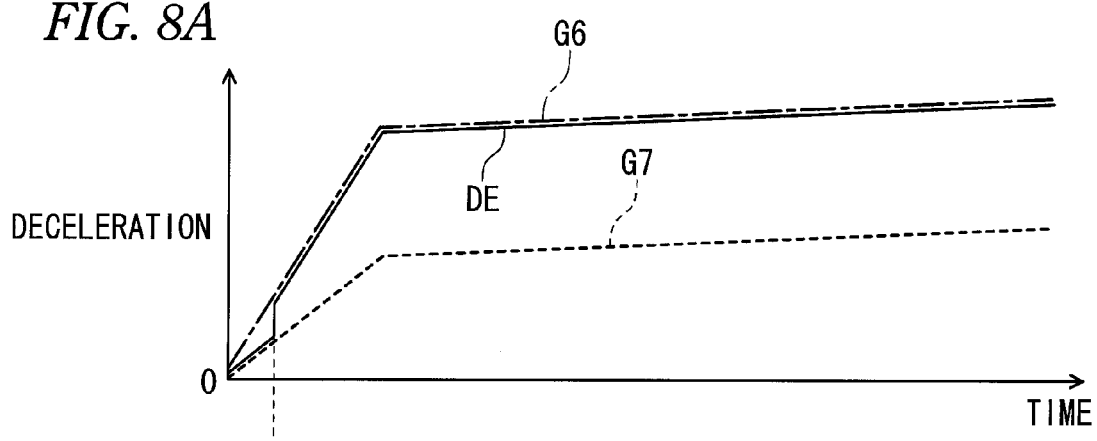
FIGS. 8A to 8C are time charts showing changes of various parameters when a vehicle with a large carried load is braked.
Figure 8B:
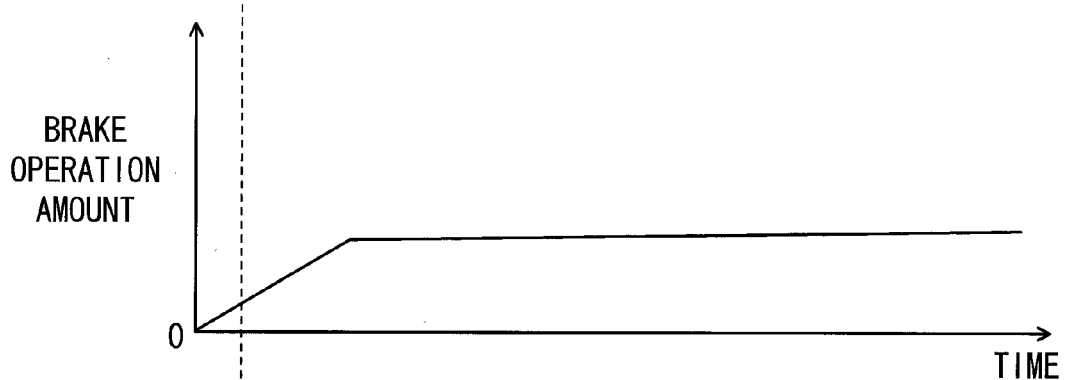
Figure 8C:
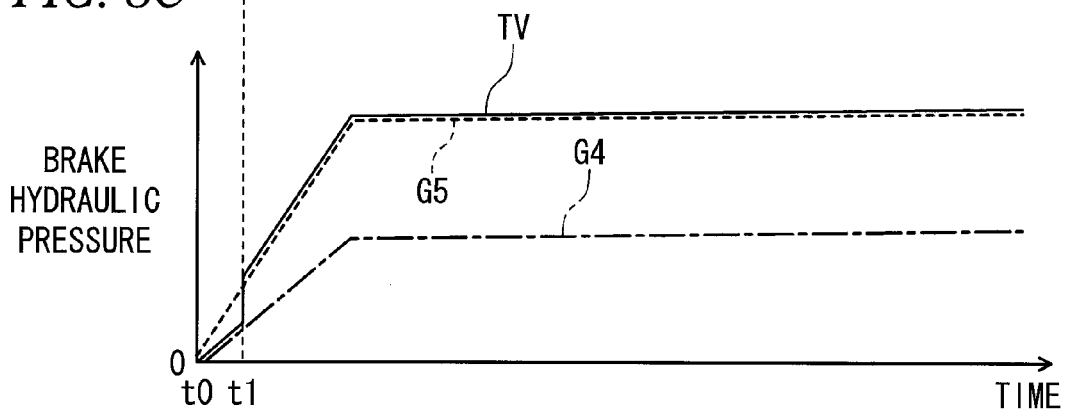

If the driver operates the brake pedal BP as shown in FIG. 8B, the target value of the brake hydraulic pressure changes in proportion to the brake operation amount as shown by a graph G4 of a one dotted chain line in FIG. 8C. In this case, if a carried load on the vehicle CR is a minimum value, the deceleration of the vehicle CR, that is, the reference deceleration changes with taking a comparatively large value as shown by a graph G6 of a one dotted chain line in FIG. 8A. However, if the carried load on the vehicle CR is large, the deceleration of the vehicle CR changes with taking a smaller value than the reference deceleration as shown by a graph G7 of a broken line in FIG. 8A.

On the other hand, according to this exemplary embodiment, if the control apparatus 100 determines that the deceleration is smaller than the reference deceleration at a time t1 at which the predetermined time has elapsed since a time 0 at which the brake pedal BP was depressed, the control apparatus 100 resets a target value TV (a solid line) of the brake hydraulic pressure to a target value (a graph G5 of a broken line) which is higher than the current target value (the graph G4 of the one dotted chain line) based on the difference between the deceleration and the reference deceleration, as shown in FIG. 8C. As a result, the brake hydraulic pressure increases, and a deceleration DE also increases in accordance with increase of the brake hydraulic pressure (see a solid line in FIG. 8A) and follows the reference deceleration.

Accordingly, the following advantageous effects can be achieved in this exemplary embodiment.

The control apparatus 100 controls the brake hydraulic pressure in accordance with a magnitude of the deceleration, that is, the carried load, so that feeling of braking during the deceleration of the vehicle CR can be restrained from changing due to differences in a carried load. Also, when the brake hydraulic pressure is increased by the electric motor 42, the normally open solenoid valves 61a and 61b are closed. Therefore, pulsation of brake liquid transmitted from the slave cylinder apparatus U2 to the master cylinder 10 can be restrained from being transmitted toward the master cylinder 10 (driver), by means of the normally open solenoid valves 61a and 61b. Furthermore, when the brake hydraulic pressure is increased by the electric motor 42, the normally close solenoid valve 62 is opened. Therefore, the hydraulic pressure generated by the master cylinder 10 is absorbed by the stroke simulator 20 through the normally close solenoid valve 62, and the driver can operate the brake pedal BP without any strange feeling.

The reference table indicating the relationship between the brake operation amount and the reference deceleration is stored in the storage 150 in advance. Thereby, brake control can be executed in accordance with the carried load without a load detection sensor. As a result, cost increase can be suppressed. Also, the brake control is executed based on the deceleration. Therefore, even if the deceleration of the vehicle differs due to a position of a luggage, a cargo or the like loaded on the vehicle CR in spite of the same carried-load, the brake control can be executed in accordance with an actual deceleration of the vehicle CR, as compared with a related-art technique in which brake control is executed, for example, based on a signal from a load detection sensor.

Since the deceleration is estimated from the wheel speeds, it is not necessary to provide a special sensor for detecting the deceleration but it is possible to suppress increase in cost.

The invention is not limited to the above exemplary embodiment, but may be implemented in various manners, for example, as shown in the following examples.

In the above exemplary embodiment, the deceleration is made to follow the reference deceleration. The invention is limited thereto. The electric motor may be controlled to reduce the difference between the deceleration and the reference deceleration. For example, the electric motor may be controlled so that the deceleration follows a value which is offset from the reference deceleration by a predetermined quantity. However, in the configuration in which the deceleration is made to follow the reference deceleration as in the above described exemplary embodiment, driver's feeling of braking can be always made to be identical with feeling for the minimum load, in spite of a load difference. Therefore, this configuration is preferable.

The brake pedal BP is shown as the brake operator in the aforementioned exemplary embodiment by way of example. The invention is not limited thereto. The brake operator may be a brake operator operated manually.

In the above described exemplary embodiment, control is executed with the deceleration of the vehicle being regarded as the carried load on the vehicle. The invention is not limited thereto. A load detection sensor configured to detect a carried load of a vehicle may be provided in the vehicle. In this case, the electric motor is controlled to increase the brake hydraulic pressure with increase of the load detected by the load detection sensor.

In the above described exemplary embodiment, the reference deceleration is defined as the deceleration of the vehicle CR in the state where the carried load on the vehicle CR is minimum. The invention is not limited thereto. The reference deceleration may be defined as a deceleration of a vehicle when a carried load on the vehicle is not minimum but a predetermined value. Also, in the above described exemplary embodiment, control is made so that the deceleration follows the reference deceleration only when the deceleration is smaller than the reference deceleration. The invention is not limited thereto. Control may be made so that the deceleration follows the reference deceleration even if the deceleration is larger than the reference deceleration. That is, when the deceleration is larger than the reference deceleration, the electric motor may be controlled to reduce the brake hydraulic pressure.

In the above described exemplary embodiment, the deceleration and the reference deceleration are treated as positive values. The invention is not limited thereto. The deceleration and the reference deceleration may be treated as negative values. In this case, the electric motor may be controlled to increase the brake hydraulic pressure to thereby reduce the difference between the deceleration and the reference deceleration when the magnitude (absolute value) of the deceleration is smaller than the magnitude (absolute value) of the reference deceleration.

In the above described exemplary embodiment, the electric motor 42 is shown as an electric actuator by way of example. The invention is not limited thereto. An electric actuator other than the electric motor may be used.

What is claimed is:

1. A brake system comprising:
    a master cylinder configured to generate a brake hydraulic pressure in response to an operation on a brake operator;
    a first solenoid valve provided between the master cylinder and a wheel brake;
    a stroke simulator provided between the master cylinder and the first solenoid valve and connected to the master cylinder through a second solenoid valve;
    a slave cylinder apparatus including
        an electric actuator, and
        a cylinder mechanism configured to generate a brake hydraulic pressure, which is applied to the wheel brake, by a driving force from the electric actuator; and
    a control apparatus configured to control the first solenoid valve, the second solenoid valve and the electric actuator, wherein
    the control apparatus is configured to close the first solenoid valve and open the second solenoid valve when the brake hydraulic pressure is increased by the electric actuator, and
    the control apparatus is configured to control the electric actuator so that the larger a carried load on a vehicle is, the larger the brake hydraulic pressure is, and
    further comprising:
        an operation amount detector configured to detect the operation amount of the brake operator, wherein
    the control apparatus includes
        a storage configured to store a reference table indicating a relationship between the operation amount and a reference deceleration, and
        a deceleration estimator configured to estimate a deceleration of the vehicle, and
    the control apparatus is configured to
        calculate the reference deceleration based on the operation amount detected by the operation amount detector and the reference table, and
        control the electric actuator to increase the brake hydraulic pressure so that a difference between the deceleration estimated by the deceleration estimator and the reference deceleration is reduced when the estimated deceleration is smaller than the reference deceleration.

2. The brake system according to claim 1, wherein the control apparatus is configured to control the electric actuator so that the deceleration estimated by the deceleration estimator follows the reference deceleration.

3. The brake system according to claim 1, wherein the deceleration estimator estimates the deceleration based on a wheel speed detected by a wheel speed sensor.

4. The brake system according to claim 2, wherein the deceleration estimator estimates the deceleration based on a wheel speed detected by a wheel speed sensor.

5. A brake system comprising:
    a master cylinder configured to generate a brake hydraulic pressure in response to an operation on a brake operator;
    a first solenoid valve provided between the master cylinder and a wheel brake;
    a stroke simulator provided between the master cylinder and the first solenoid valve and connected to the master cylinder through a second solenoid valve;

a slave cylinder apparatus including
an electric actuator, and
a cylinder mechanism configured to generate a brake hydraulic pressure, which is applied to the wheel brake, by a driving force from the electric actuator;
an operation amount detector configured to detect the operation amount of the brake operator;
a control apparatus configured to control the first solenoid valve, the second solenoid valve and the electric actuator, wherein
the control apparatus includes
a storage configured to store a reference table indicating a relationship between the operation amount and a reference deceleration, and
a deceleration estimator configured to estimate a deceleration of the vehicle, and
the control apparatus is configured to close the first solenoid valve and open the second solenoid valve when the brake hydraulic pressure is increased by the electric actuator, and
the control apparatus is configured to
calculate the reference deceleration based on the operation amount detected by the operation amount detector and the reference table, and
control the electric actuator to increase the brake hydraulic pressure so that a difference between the deceleration estimated by the deceleration estimator and the reference deceleration is reduced when the estimated deceleration is smaller than the reference deceleration, and
the control apparatus is configured to control the electric actuator so that the larger a carried load on a vehicle is, the larger the brake hydraulic pressure is.

6. The brake system according to claim 5, wherein the reference table indicating the relationship between the operation amount and the reference deceleration is stored in the storage in advance such that antilock brake control is executed in accordance with the carried load without a load detection sensor.

7. The brake system according to claim 6, wherein the brake control is executed based on an actual deceleration of the vehicle even if deceleration of the vehicle differs due to the carried load.

8. The brake system according to claim 7, wherein when the brake hydraulic pressure is increased in a case where the deceleration is smaller than the reference deceleration, the brake hydraulic pressure is increased in accordance with an increase in the carried load.

9. The brake system according to claim 1, further comprising a deceleration estimator that estimates a deceleration of the vehicle based on wheel speeds of wheels detected by wheel speed sensors.

10. The brake system according to claim 9, wherein the deceleration estimator estimates a smallest deceleration of decelerations of the wheels as the deceleration of the vehicle.

11. The brake system according to claim 9, further comprising a reference deceleration calculator which calculates a reference deceleration based on a brake operation amount detected by a brake pedal stroke sensor and a reference table.

12. The brake system according to claim 11, wherein the reference deceleration is a deceleration of the vehicle with respect to the brake operation amount.

13. The brake system according to claim 12, further comprising
an electric motor controller, which after a predetermined time has elapsed since the brake pedal was depressed, compares the deceleration estimated by the deceleration estimator with the reference deceleration and determines as to whether or not the deceleration is smaller than the reference deceleration.

14. The brake system according to claim 13, wherein if the electric motor controller determines that the deceleration is smaller than the reference deceleration, the electric motor controller resets a target value of the brake hydraulic pressure to a target value which is higher than a current target value of the brake hydraulic pressure, in accordance with a difference between the deceleration and the reference deceleration, and controls the electric actuator based on the reset target value.

15. The brake system according to claim 14, wherein the electric motor controller sets the target value of the brake hydraulic pressure to be a higher value as the deceleration becomes smaller with respect to the reference deceleration, such that the brake hydraulic pressure becomes higher as the deceleration becomes smaller with respect to the reference deceleration.

* * * * *